(12) United States Patent
Hayashi et al.

(10) Patent No.: US 12,079,602 B2
(45) Date of Patent: Sep. 3, 2024

(54) SYSTEMS AND METHODS FOR A CONVERSATIONAL FRAMEWORK OF PROGRAM SYNTHESIS

(71) Applicant: Salesforce, Inc., San Francisco, CA (US)

(72) Inventors: Hiroaki Hayashi, Palo Alto, CA (US); Yingbo Zhou, Palo Alto, CA (US); Bo Pang, Los Angeles, CA (US); Erik Nijkamp, Los Angeles, CA (US)

(73) Assignee: Salesforce, Inc., San Francisco, CA (US)

( * ) Notice: Subject to any disclaimer, the term of this patent is extended or adjusted under 35 U.S.C. 154(b) by 209 days.

(21) Appl. No.: 17/889,998

(22) Filed: Aug. 17, 2022

(65) Prior Publication Data

US 2023/0280985 A1    Sep. 7, 2023

Related U.S. Application Data

(60) Provisional application No. 63/317,244, filed on Mar. 7, 2022.

(51) Int. Cl.
    *G06F 8/35* (2018.01)
    *G06F 8/10* (2018.01)
    *G06N 20/00* (2019.01)

(52) U.S. Cl.
    CPC ............ *G06F 8/35* (2013.01); *G06F 8/10* (2013.01); *G06N 20/00* (2019.01)

(58) Field of Classification Search
    USPC ....................................................... 717/104
    See application file for complete search history.

(56) References Cited

U.S. PATENT DOCUMENTS

| 2017/0239576 | A1  | 8/2017  | Hsiao       |            |
|--------------|-----|---------|-------------|------------|
| 2019/0155588 | A1* | 5/2019  | Panchomarthi| G06N 20/20 |
| 2019/0325316 | A1* | 10/2019 | Anderson    | G16H 50/30 |
| 2020/0372341 | A1* | 11/2020 | Asai        | G06F 40/40 |
| 2021/0327413 | A1* | 10/2021 | Suwandy     | G06N 3/045 |
| 2022/0108182 | A1* | 4/2022  | Anderson    | G06N 3/086 |
| 2022/0139384 | A1* | 5/2022  | Wu          | G06F 40/35 |
|              |     |         |             | 704/257    |

(Continued)

OTHER PUBLICATIONS

International Search Report and Written Opinion for PCT/US2023/062959, dated May 22, 2023, 11 pages.

(Continued)

*Primary Examiner* — Qing Chen
*Assistant Examiner* — Clint Thatcher
(74) *Attorney, Agent, or Firm* — Haynes and Boone, LLP

(57) ABSTRACT

Embodiments described herein provide a program synthesis framework that generates code programs through a multi-turn conversation between a user and a system. Specifically, the description to solve a target problem is factorized into multiple steps, each of which includes a description in natural language (prompt) to be input into the generation model as a user utterance. The model in turn synthesizes functionally correct subprograms following the current user utterance and considering descriptions and synthesized subprograms at previous steps. The subprograms generated at the multiple steps are then combined to form an output of program in response to the target problem.

20 Claims, 7 Drawing Sheets

(56) References Cited

U.S. PATENT DOCUMENTS

2022/0230061 A1\* 7/2022 Singh .................... G06F 16/243
2023/0169273 A1\* 6/2023 Koneru .................. G06F 40/30
704/9

OTHER PUBLICATIONS

Ho, "Transformers in Natural Language Processing—A Brief Survey", May 23, 2020 (May 23, 2020), pp. 1-16 [retrieved on May 8, 2023], Retrieved from the Internet: URL:https://www.georgeho.org/transformers-in-nlp/, pp. 1-16.

Jain et al., "Jigsaw: Large Language Models meet Program Synthesis", arxiv.org, Cornell University Library, 201 Olin Library Cornell University Ithaca, NY 14853, Dec. 6, 2021, 12 pages.

Poesia et al., "Synchromesh: Reliable code generation from pre-trained language models", arxiv.org, Cornell University Library, 201 Olin Library Cornell University Ithaca, NY 14853, Jan. 26, 2022, pp. 1-19.

Wikipedia, "Tensor Processing Unit", Feb. 22, 2022, [retrieved on May 8, 2023], Retrieved from: URL:https://en.wikipedia.org/w/index.php?title=Tensor_Processing_Unit&oldid=1073426247, 6 pages.

zerowithdot.com, "Training on batch: how do you split the data?", Dec. 30, 2019, [retrieved on May 8, 2023], Retrieved from the Internet: URL:https://zerowithdot.com/splitting-to-batches/, 8 pages.

\* cited by examiner

① Discourse — 501

- Input `"... abc.xyz@example.com ..."` — 505
- $p_1$ Import re and define a regular expression that matches an email address.
  *Human*
- $s_1$ `import re`
  `email_regex = re.compile("[a-zA-Z0-9_.+-]+@[a-zA-Z0-9-.]+")`
  *Model*
- $p_2$ Search for an email address in "{input}" and store the first match to a variable "address"
  *Human*
- $s_2$ `address = email_regex.search("... abc.xyz@example.com ...")`
  *Model*
- $p_3$ Remove the substring starting from the @ symbol from "address".
  *Human*
- $s_3$ `address = address.group(0)`
  `address = address[:address.find("@")]`
  *Model*
- $p_4$ Replace non-alphabetical symbols with a whitespace in "address".
  *Human*
- $s_4$ `address = re.sub("[^a-zA-Z]+", " ", address)`
  *Model*
- $p_5$ Print out "address".
  *Human*
- $s_5$ `Print (address)`
  *Model*

510 — Expected Output `"abc xyz"`

② Generation — 502

Sample

- Turn 1: $p_1 \rightarrow s_1$
- Turn 2: $p_1\ s_1\ p_2 \rightarrow s_2$
- Turn 3: $p_1\ s_1\ p_2\ s_2\ p_3 \rightarrow s_3$
- Turn 4: $p_1\ s_1\ p_2\ s_2\ p_3\ s_3\ p_4 \rightarrow s_4$
- Turn 5: $p_1\ s_1\ p_2\ s_2\ p_3\ s_3\ p_4\ s_4\ p_5 \rightarrow s_5$ Concatenate

③ Evaluation — 503

```
# Import re and define a regular expression that matches an ...
import re
email_regex = re.compile("[a-zA-Z0-9_.+-]+@[a-zA-Z0-9-.]+")
# Search for an email address in "... abc.xyz@example.com ..." and ...
address = email_regex.search("... abc.xyz@example.com ...")
# Remove the substring starting from the @ symbol from "address".
address = address.group(0)
address = address[:address.find("@")]
# Replace non-alphabetical symbols with a whitespace in "address".
address = re.sub("[^a-zA-Z]+", " ", address)
# Print out "address".
Print (address)
```
— 515

Execute → `"abc xyz"` Actual Output — 520

| Model | pass@k [%] | | |
|---|---|---|---|
| | k = 1 | k = 10 | k = 100 |
| GPT-NEO 350M | 0.85 | 2.55 | 5.95 |
| GPT-NEO 2.7B | 6.41 | 11.27 | 21.37 |
| GPT-J 6B | 11.62 | 15.74 | 27.74 |
| CODEX 300M | 13.17 | 20.37 | 36.27 |
| CODEX 2.5B | 21.36 | 35.42 | 59.50 |
| CODEX 12B | 28.81 | 46.81 | 72.31 |
| CODEGEN-NL 350M | 2.12 | 4.10 | 7.38 |
| CODEGEN-NL 2.7B | 6.70 | 14.15 | 22.84 |
| CODEGEN-NL 6.1B | 10.43 | 18.36 | 29.85 |
| CODEGEN-NL 16.1B | 14.24 | 23.46 | 38.33 |
| CODEGEN-MULTI 350M | 6.67 | 10.61 | 16.84 |
| CODEGEN-MULTI 2.7B | 14.51 | 24.67 | 38.56 |
| CODEGEN-MULTI 6.1B | 18.16 | 28.71 | 44.85 |
| CODEGEN-MULTI 16.1B | 18.32 | 32.07 | 50.80 |
| CODEGEN-MONO 350M | 12.76 | 23.11 | 35.19 |
| CODEGEN-MONO 2.7B | 23.70 | 36.64 | 57.01 |
| CODEGEN-MONO 6.1B | 26.13 | 42.29 | 65.82 |
| CODEGEN-MONO 16.1B | 29.28 | 49.86 | 75.00 |

*FIG. 6*

| CODEGEN-MONO | 350M | 2.7B | 6.1B | 16.1B |
|---|---|---|---|---|
| Pass | 3.78 ± 0.23 | 3.66 ± 0.14 | 3.35 ± 0.13 | 3.12 ± 0.11 |
| Non-Pass | 5.18 ± 0.19 | 4.37 ± 0.18 | 3.88 ± 0.13 | 3.40 ± 0.11 |

*FIG. 7*

| Data | Model | Pass Rate[†] [%] | | | |
|---|---|---|---|---|---|
| | | 350M | 2.7B | 6.1B | 16.1B |
| THEPILE | GPT-NEO & GPT-J | 0.79 | 8.17 | 18.86 | - |
| THEPILE | CODEGEN-NL | 0.23 | 15.31 | 19.37 | 30.33 |
| BIGQUERY | CODEGEN-MULTI | 4.09 | 20.82 | 25.51 | 26.27 |
| BIGPYTHON | CODEGEN-MONO | 16.98 | 38.72 | 43.52 | 47.31 |

*FIG. 8*

| Prompt | PPL↓ | | | | Pass Rate↑ [%] | | | |
|---|---|---|---|---|---|---|---|---|
| | 350M | 2.7B | 6.1B | 16.1B | 350M | 2.7B | 6.1B | 16.1B |
| Single-Turn | 13.92 ± 1.89 | 11.67 ± 1.46 | 10.58 ± 1.20 | 10.25 ± 0.99 | 5.75 | 25.43 | 28.48 | 38.74 |
| Multi-Turn | 10.09 ± 0.62 | 8.90 ± 0.52 | 8.18 ± 0.43 | 8.05 ± 0.43 | 16.98 | 38.72 | 43.52 | 47.31 |

SYSTEMS AND METHODS FOR A CONVERSATIONAL FRAMEWORK OF PROGRAM SYNTHESIS

TECHNICAL FIELD

The present application is a nonprovisional of and claims priority to 35 U.S.C. 119 to U.S. provisional application No. 63/317,244, filed Mar. 7, 2022, which is hereby expressly incorporated by reference herein in its entirety.

TECHNICAL FIELD

The present disclosure relates generally to machine learning models and automatic code generation, and more specifically, to pretraining a machine learning model for conversational program synthesis.

BACKGROUND

Program synthesis is to automatically generate a program, often via a machine learning model, in a programming language (such as Python, C++, Pearl, etc.) and satisfying the user intent expressed in the form of some specification (e.g., in natural language). Successful program synthesis improves productivity of experienced programmers, and also make programming accessible to a much wider user basis. However, long-term challenges in program synthesis remain unfulfilled. For example, to maintain an expressive search space, a large search space of programming codes is often involved. Thus, it remains challenging to efficiently search through the large volume of candidates in the enormous search space.

For another example, providing a proper specification of user intent for code generation remains difficult. User intent for program synthesis can be logical specification which specifies a logical relation between inputs and outputs of a program, input-output examples, or natural language. A complete formal or informal specification requires too much effort for users to provide, because the compiling of the specification alone might even require a comparable amount of effort as that for program production per se, which defeats the purpose of program synthesis. However, simpler specifications, such as those merely with input-output examples or abstract descriptions in natural language might under-specify the problem, leading to undesirable solutions.

Therefore, there is a need for a program synthesis approach that address these issues.

BRIEF DESCRIPTION OF THE DRAWINGS

FIG. 5 is a simplified block diagram illustrating a synthesis example of a program via a multi-turn conversation, according to embodiments described herein.

FIGS. 6-10 are example data performance charts illustrating example performance of the conversational program synthesis module described in FIGS. 1-5, according to embodiments described herein.

Figure 1:
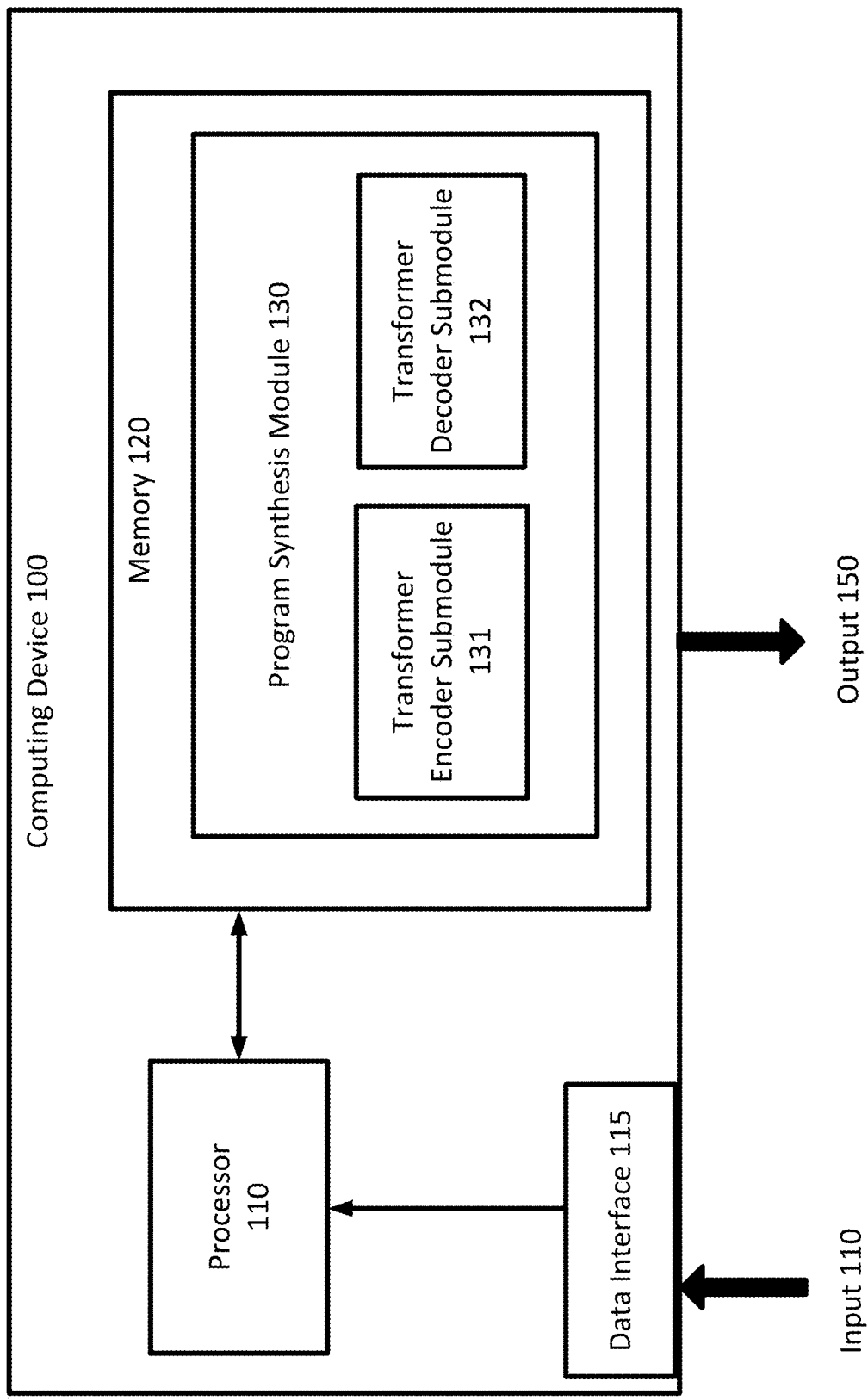
FIG. 1 is a simplified diagram of a computing device for implementing the conversational program synthesis system, according to some embodiments.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

In view of the challenges in efficient search and specifying user intent in program synthesis, embodiments described herein provide a program synthesis framework that generates code programs through a multi-turn conversation between a user and a system. Specifically, the description to solve a target problem is factorized into multiple steps, each of which includes a description in natural language (prompt) to be input into the generation model as a user utterance. The model in turn synthesizes functionally correct subprograms following the current user utterance and considering descriptions and synthesized subprograms at previous steps. The subprograms generated at the multiple steps are then combined to form an output of program in response to the target problem.

In another embodiment, the generated program may also be incorrect when the code generation model has high uncertainty. The program synthesis framework may generate questions to clarify user intent. In this way, user responses to the system questions may be used as user intent.

In one embodiment, user intent for program synthesis is used as specification which specifies a logical relation between inputs and outputs of a program, input-output examples, or natural language. As most programmers do not develop a comprehensive vision of their intent until they are well into the programming process, an interactive program synthesis approach may be adopted, where a user interacts with the synthesis system by progressively providing specifications in natural language while receiving responses from the system in the form of synthesized sub-programs, such that the user together with the system interactively complete the program in a multi-turn conversation.

In one embodiment, the program synthesis framework can be built on a Transformer model which is used to capture the dependency among sequence elements through attention mechanism. For example, a large autoregressive transformer is trained on a large-scale Python dataset powered by cloud tensor processing units (TPUs).

In one embodiment, to improve training efficiency due to the large size of the Transformer model for program synthesis, a parallelism technique is adopted, where the same computation can be run on different input data in parallel on different devices. Specifically, for data parallelism, a batch of training data is partitioned and distributed to individual TPU-virtual machines (VMs). For model parallelism, two schemes for the sharding of model parameters are supported: (1) Intra-TPU-VM, where parameters are sharded across matrix unit (MXU) cores inside a physical TPU board and replicated across boards; (2) Inter-TPU-VM, where parameters are sharded across TPU-v4 boards and activations are replicated.

FIG. 1 is a simplified diagram of a computing device for implementing the conversational program synthesis system, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a program synthesis module 130 that may be used to implement and/or emulate the systems and models, and/or to implement any of the methods described further herein. In some examples, the online adaptation module 130, may receive an input 140, e.g., such as a natural language input specifying a user intent via a data interface 115. The program synthesis module 130 may generate an output 150 of a program snippet in response to the input 140.

For example, the program synthesis module 130 may comprise bi-directional t transformer encoders 131 and auto-regressive transformer decoders 132 with the regular next-token prediction language modeling as the learning objective. The architecture of the program synthesis module 130 may thus follow a Transformer decoder with left-to-right causal masking. The encoder 131 may adopt rotary position embedding for the positional encoding (further details of positional encoding can be found in Su et al., Roformer: Enhanced transformer with rotary position embedding. arXiv preprint arXiv:2104.09864, 2021). For the forward pass, the encoder 131 and the decoder 132 may comprise self-attention and feed-forward circuits in parallel for improved communication overhead. Specifically, the module output can be generated according to:

$$x_{t+1} = x_t + \text{attn}(\ln(x_t)) + mlp(\ln(x_t))$$

For which the computation of self-attention, attn( ) and feed-forward, mlp( ) with layer-norm, ln( ) can be implemented simultaneously. During implementation, the architecture and hyper-parameter choices were optimized specifically for the hardware layout of TPU-v4.

In some examples, the program synthesis module 130 may be implemented using hardware, software, and/or a combination of hardware and software.

Some examples of computing devices, such as computing device 100 may include non-transitory, tangible, machine readable media that include executable code that when run by one or more processors (e.g., processor 110) may cause the one or more processors to perform the processes of method. Some common forms of machine readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
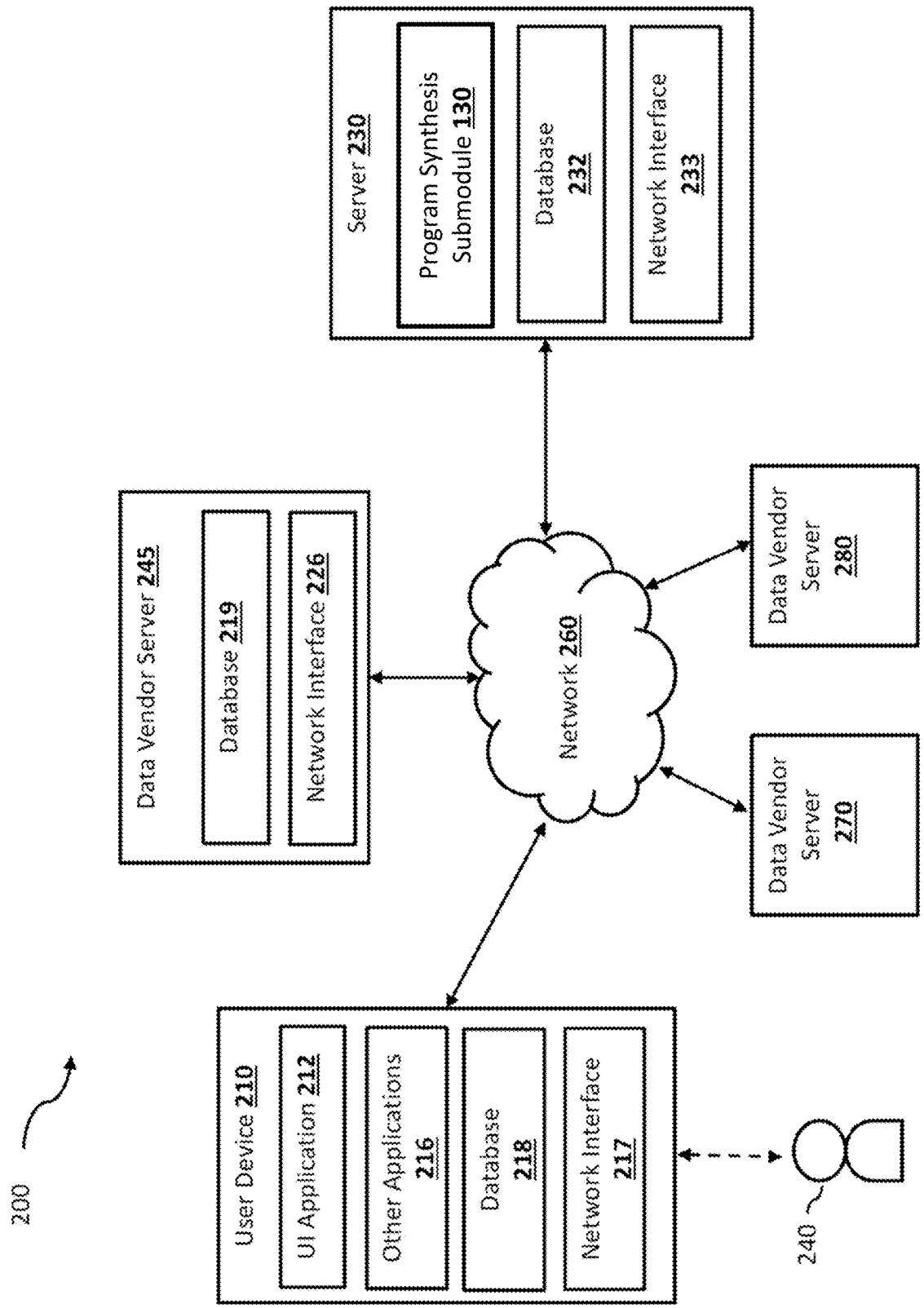
FIG. 2 is a simplified block diagram of a networked system suitable for implementing the program synthesis framework described in FIG. 1 and other embodiments described herein.

FIG. 2 is a simplified block diagram of a networked system suitable for implementing the program synthesis framework described in FIG. 1 and other embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating synthesized code program from the server 230 and display the message via the UI application 212. In other embodiments, user device 210 may include additional or different modules having specialized hardware and/or software as required.

In various embodiments, user device 210 includes others may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the code program output.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 217 adapted to communicate with data vendor server 245 and/or the server 230. In various embodiments, network interface component 217 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or applications 216 collectively referred to as 203) to provide training datasets including input-output (e.g., description-code, etc.) examples to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the program synthesis module 130 and its submodules described in FIG. 1. In some implementations, the program synthesis module 130 may receive data from database 219 at the data vendor server 245 via the network 260 to generate the synthesized code program. The generated code program may also be sent to the user device 210 for review by the user 240 via the network 260.

For example, example datasets obtained from the data vendor servers 245, 270, 280 may include THEPILE, BIGQUERY, and BIGPYTHON. The natural language dataset THEPILE is an 825.18 GiB English text corpus collected as described in Gao et al., The pile: An 800 gb dataset of diverse text for language modeling. arXiv preprint arXiv: 2101.00027, 2020, for language modeling. The dataset is constructed from 22 diverse high-quality subsets, one of which is programming language data collected from GitHub repositories with >100 stars that constitute 7.6% of the dataset. As the majority of THEPILE is English text, the resulting models are called call the models as natural language CODEGEN models (CODEGEN-NL).

For another example, the multi-lingual dataset BIGQUERY is a subset of Google's publicly available BigQuery dataset, which consists of code (under open-source license) in multiple programming languages. For the multilingual training, the following 6 programming languages are chosen: C, C++, Go, Java, JavaScript, and Python. Thus, models trained on the BIGQUERY are referred to as multi-lingual CODEGEN models (CODEGEN-MULTI).

For another example, the mono-lingual dataset BIGPYTHON contains a large amount of data in the programming language Python. Public, non-personal information from GitHub consisting of permissively licensed Python code in October 2021 is compiled. Consequently, models trained on BIGPYTHON is referred to as mono-lingual CODEGEN models (CODEGEN-MONO).

Thus, the program synthesis module 130 may train the family of CODEGEN models in various sizes of the Transformer model with 350M, 2.7B, 6.1B, and 16.1B parameters. The first three configurations allow for direct comparison with open-sourced large language models trained on text corpus, GPT-NEO (350M, 2.7B) and GPT-J120 (6B).

The database 232 may be stored in a transitory and/or non-transitory memory of the server 230. In one implementation, the database 232 may store data obtained from the data vendor server 245. In one implementation, the database 232 may store parameters of the program synthesis model 130. In one implementation, the database 232 may store previously generated code programs, benchmarks and/or the like.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
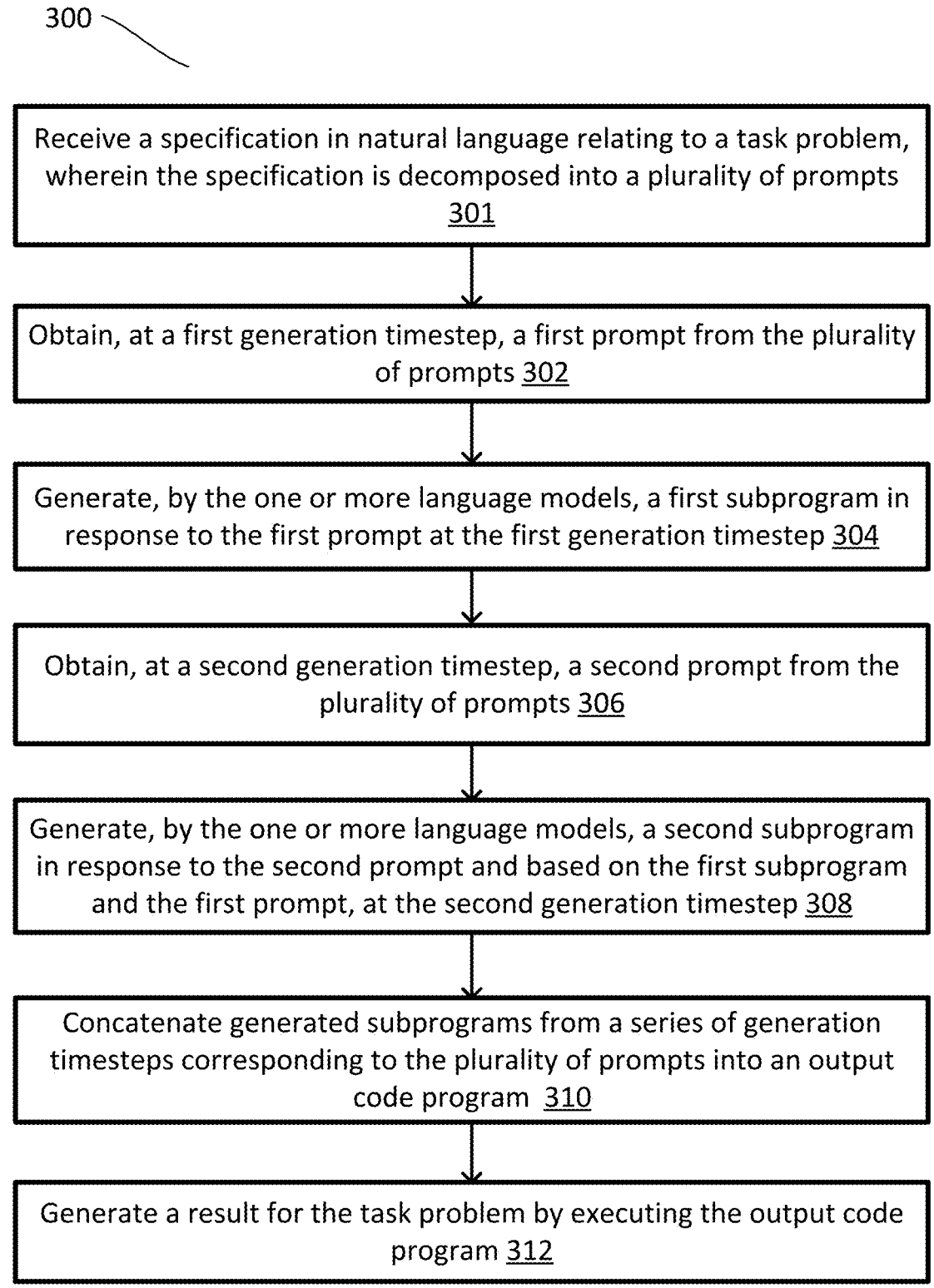
FIG. 3 is an example logic flow diagram illustrating a method of code program synthesis for a target problem based on the framework shown in FIGS. 1-2, according to some embodiments described herein.

FIG. 3 is an example logic flow diagram illustrating a method of code program synthesis for a target problem based on the framework shown in FIGS. 1-2, according to some embodiments described herein. One or more of the processes of method 300 may be implemented, at least in part, in the form of executable code stored on non-transitory, tangible, machine-readable media that when run by one or more processors (e.g., TPUs having a high-speed toroidal mesh interconnect) may cause the one or more processors to perform one or more of the processes. In some embodiments, method 300 corresponds to the operation of the program synthesis module 130 (e.g., FIGS. 1-2) that performs program synthesis for a target problem.

At step 301, a specification in natural language relating to a task problem may be received, e.g., via a communication interface (e.g., 115 in FIG. 1). For example, as shown in FIG. 5, the specification of the task problem may be "extracting the user name of an email address."

In one implementation, the specification may be decomposed into a plurality of prompts, e.g., see $p_1$-$p_5$ in FIG. 5. In one implementation, the specification is paired with an expected result of the task problem, e.g., the sample code subprograms $s_1$-$s_5$ in FIG. 5. The generated result is compared with the expected result for evaluating accuracy of the one or more language models.

At step 302, at a first generation timestep, a first prompt from the plurality of prompts may be obtained, e.g., see $p_1$ "import re and define a regular expression that matches an email address" in FIG. 5.

At step 304, in response to the first prompt at the first generation timestep, a first subprogram (e.g., see $s_1$ in FIG. 5) may be generated, by the one or more language models. For example, the one or more language models comprise one or more auto-regressive Transformer models trained by a next-token prediction language modeling objective.

In some implementations, the program synthesis model may generate one or more questions, in natural language, to further clarify the user intent. This may happen prior to the first generation timestep, or at the first or any subsequent generation timestamp. A user may provide a natural language response to further clarify the user intent in program generation. The user provided response may be combined into the next generation timestep such that the next subprogram may be generated conditioned on the user provided response.

At step 306, at a second generation timestep, a second prompt (e.g., see $p_2$ in FIG. 5) from the plurality of prompts may be obtained.

At step 308, a second subprogram (e.g., see $s_2$ in FIG. 5) is generated, by the one or more language models, in response to the second prompt and based on the first subprogram and the first prompt, at the second generation timestep. In some implementations, if a user response for clarification is received, the second subprogram may be generated further conditioned on the user response.

At step 310, the generated subprograms (e.g., $s_1$-$s_5$ in FIG. 5) from a series of generation timesteps corresponding to the plurality of prompts into an output code program may be concatenated.

At step 312, a result (e.g., see 530 in FIG. 5) for the task problem may be generated by executing the output code program.

Figure 4:
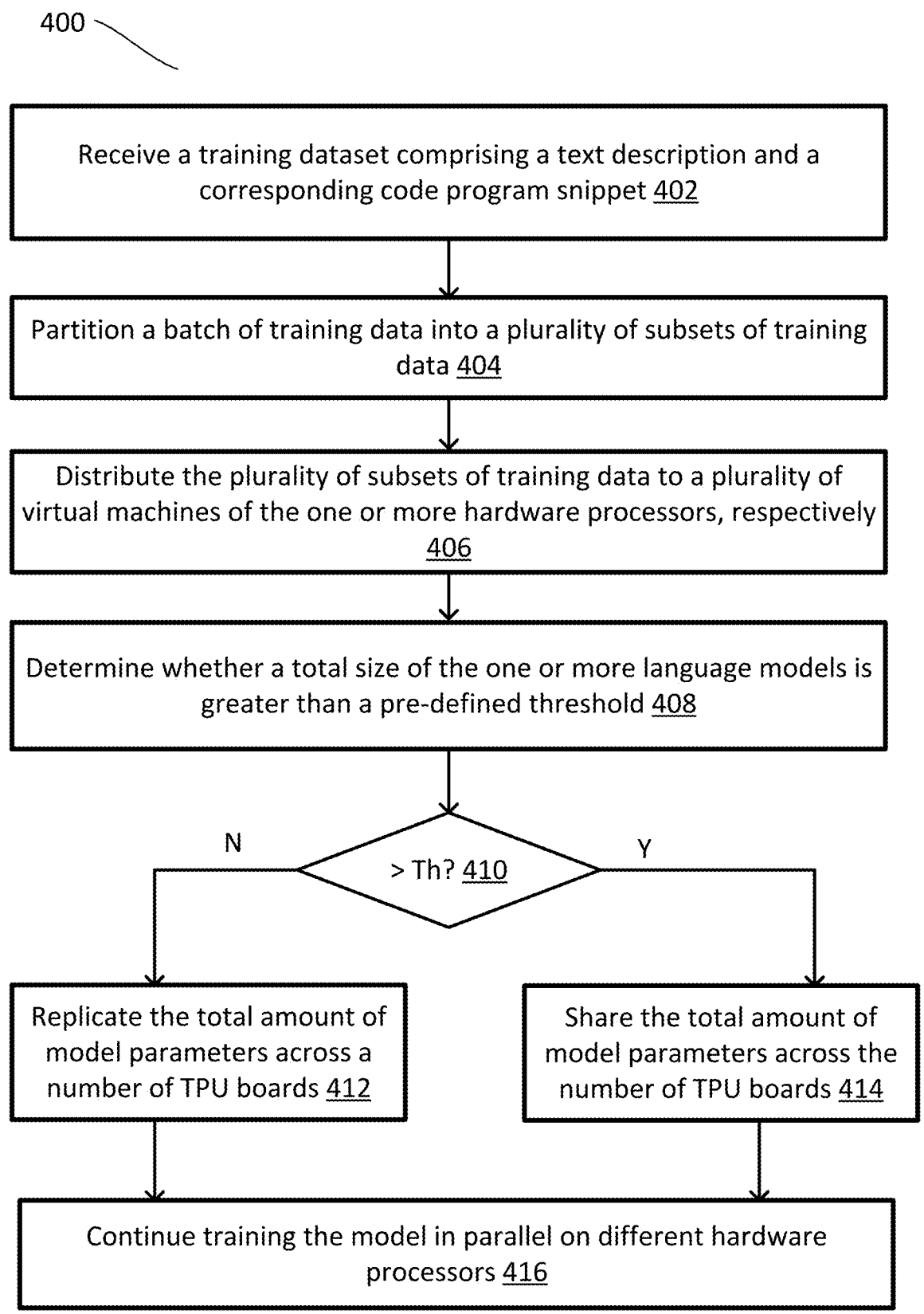
FIG. 4 is an example logic flow diagram illustrating a method of training the program synthesis module shown in FIGS. 1-2 on a plurality of processors in parallel, according to some embodiments described herein.

FIG. 4 is an example logic flow diagram illustrating a method of training the program synthesis module 130 shown in FIGS. 1-2 on a plurality of processors in parallel, according to some embodiments described herein. One or more of the processes of method 400 may be implemented, at least in part, in the form of executable code stored on non-transitory, tangible, machine-readable media that when run by one or more processors (e.g., TPUs having a high-speed toroidal mesh interconnect) may cause the one or more processors to perform one or more of the processes. In some embodiments, method 400 corresponds to the operation and training of the program synthesis module 130 (e.g., FIGS. 1-2) that performs program synthesis for a target problem. For example, as discussed in relation to FIGS. 1-2, the program synthesis module 130 may comprise one or more language models, which are trained on the one or more hardware processors (e.g., processor 101 in FIG. 1) by performing the same computation on different input data in parallel on different hardware processors.

For example, TPU hardware with a high-speed toroidal mesh interconnect may allow for efficient parallelism. To efficiently utilize the hardware, the training of the models is implemented in JAX. For parallel evaluation in JAX the pjit( ) operator is adopted. The operator enables a paradigm named single-program, multiple-data (SPMD) code, which refers to a parallelism technique where the same computation is run on different input data in parallel on different devices. Specifically, pjit( ) is the API exposed for the XLA SPMD partitioner in JAX, which allows a given function to be evaluated in parallel with equivalent semantics over a logical mesh of compute.

At step 402, a training dataset comprising pairs of a text description and a corresponding code program snippet may be received.

At step 404, a batch of training data may be partitioned into a plurality of subsets of training data.

At step 406, the plurality of subsets of training data may be distributed to a plurality of virtual machines of the one or more hardware processors, respectively. For example, the library JAXFORMER may recruit a designated coordinator node to orchestrate the cluster of TPU-VMs with a custom TCP/IP protocol. For data parallelism, the coordinator partitions a batch and distributes the partitions to the individual TPU-VMs.

In one implementation, for model parallelism, two schemes for the sharding of model parameters are supported: (1) Intra-TPU-VM, where parameters are sharded across MXU cores inside a physical TPU-v4 board and replicated across boards; (2) Inter-TPU-VM, where parameters are sharded across TPU-v4 boards and activations are replicated. Both intra-TPU-VM and inter-TPU-VM sharding schemes are implemented based on the specific pjit( ) a logical mesh specification (r, p, c) with r replicas of the parameters, p partitions of the parameters, and c logical cores per board over $n_b$ TPU boards with each $n_c$ logical cores such that d×p=$n_b$ and r×p×c=$n_b$×$n_c$.

At step 408, the program synthesis module 130 may determine whether a total size of the one or more language models is greater than a pre-defined threshold. For example, the intra-TPU-VM scheme is adopted for models of size of less or equal to 6B parameters, the total amount of model and optimizer parameters fit into the combined HBM memory of a single TPU-v4 board.

At step 410, in response to determining that a total size of the one or more language models is no greater than a pre-defined threshold, method 400 may proceed to step 412, at which the total amount of model parameters is replicated across a number of TPU boards. For instance, a TPU-v4-512 slice with nb=64 and nc=4 would be configured as (r, p, c)=(64, 1, 4). That is, the parameters are being replicated across r=64 boards with p=1 total inter-board partitions and intra-board parallelism across c=4 logical chips. In this configuration, the mean gradient is accumulated across boards via with_sharding_constraint( ) effectively emulating the behavior of the xmap( ) operator.

At step 410, in response to determining that a total size of the one or more language model is greater than the pre-defined threshold, method 400 may proceed to step 414, at which the module shares the total amount of model parameters across the number of TPU boards. For example, the inter-TPU-VM scheme is adopted for models exceeding the size of 6B parameters for which the model and optimizer parameters have to be sharded across TPU-v4 boards. For instance, a TPU-v4-512 slice with nb=64 and nc=4 would be configured as (r, p, c)=(1, 64, 4). For larger slices such as TPU-v4-1024 with nb=128, one may introduce redundancy in the parameter sharding, e.g., (r, p, c)=(2, 64, 4). In this configuration, the activations are replicated across boards via with_sharding_constraint( ) Moreover, (r, p, c) allows for backwards compatibility for the logical hardware layout transition from TPU-v3 with c=8 to TPU-v4 with c=4 by adjusting p without the need for re-sharding.

Method 400 then proceeds to step 416, at which the module continues training the language models in parallel on different hardware processors. For example, the Adam optimizer (described in Kingma et al., Adam: A method for stochastic optimization, in proceedings of International Conference on Learning Representation (Poster), 2015) may be adopted for the training with parameters ($\beta 1$, $\beta 2$, $\in$)=(0.9, 0.999, 1e-08) and global gradient norm clipping of 1.0. The learning rate function over time may follow GPT-3 (described in Brown et al., Language models are few-shot learners, Advances in neural information processing systems, 33:1877-1901, 2020) with warm-up steps and cosine annealing.

FIG. 5 is a simplified block diagram illustrating a synthesis example of a program via a multi-turn conversation, according to embodiments described herein. The illustrative example 500 shows a multi-turn programming benchmark, performing the task of extracting the user name of an email address. For example, a natural language description of the task may be decomposed, as shown by the designed discourse 501, into a series of prompts p1-p5 to be carried out in multiple turns.

At generation 502, each turn consists of a prompt and a generated response by one or more language models. The prompt p1-p5 can include a template that accepts various test cases (i.e. {input} for different task description). For example, for each problem, 5 test cases may be provided, each of which includes (a) an input 505, which replaces {input} in the prompt before it is fed to the model, and (b) an expected output 510, to which the output of the generated program is compared, to evaluate its functional correctness. In the displayed example 500, the input 505 is a string containing abc.xyz@example.com, which replaces {input} in $p_2$, and the expected output is abc xyz. The model conditions on the concatenation of interleaved past prompts and generated responses.

At generation 502, at each term, the language models generate a subprogram s1-s5 based on the prompt p1-p5 and previously generated subprograms. For example, at turn 1, the subprogram s1 is generated using the prompt p1 as an input. At turn 2, the subprogram s2 is generated using an input concatenating p1, s1, and p2. The process may continue until all five prompts p1-p5 have been handled. The resulting subprograms at each turn, s1-s5 are then concatenated to form the final output code program 515.

At evaluation 503, the output code program 515 may be executed to generate an actual output result 520, which is compared to an expected output 510.

During training, the input training data may comprise the problem description and an expected output 510 to the problem. Thus, a training objective (e.g., cross-entropy) may be computed by comparing the actual output 520 generated from the language models and the expected output 510. The training objective may then be used to update the language models.

EXAMPLE DATA EXPERIMENTS

In one embodiment, functional correctness (as described in Hendrycks et al., Measuring coding challenge competence with APPS, in Thirty-fifth Conference on Neural Information Processing Systems Datasets and Benchmarks Track (Round 2), 2021) is used to evaluate models for program synthesis. The evaluations are conducted on a single-turn and a multi-turn benchmark. Both benchmarks are hand-written to avoid data leakage from the training data. The models are evaluated on both the single-turn evaluation benchmark and a proposed multi-turn benchmark.

HumanEval is a benchmark to measure a model's program synthesis capacity in Python (MIT license). It contains 164 hand-written programming problems. Each problem provides a prompt with descriptions of the function to be generated, function signature, and example test cases in the form of assertions. The model needs to complete a function given the prompt such that it can pass all provided test cases. Since a user intent is specified in a single prompt and provided to the model once, the evaluation on HumanEval is regarded as a single-turn evaluation, to distinguish it from the multi-turn evaluation where a user intent is factorized into multiple steps. Following the sampling strategy in Holtzman et al., The curious case of neural text degeneration, in proceedings of International Conference on Learning Representation, 2020, 158 nucleus sampling with top-p where p=0.95.

The models 130 are compared to the Codex models described in Chen et al., Evaluating large language models trained on code, arXiv preprint arXiv:2107.03374, 2021, which demonstrate the state-of-the-art performance on the HumanEval. Moreover, the program synthesis models 130 are compared to open-sourced large language models, GPT NEO (Black et al., GPT-Neo: Large Scale Autoregressive Language Modeling with Mesh-Tensorflow, March 2021) and GPT-J (Wang et al., GPT-J-6B: A 6 Billion Parameter Autoregressive Language Model, May 2021). These are trained on THEPILE (described in Gao et al., The pile: An 800 gb dataset of diverse text for language modeling. arXiv preprint arXiv:2101.00027, 2020), and thus similar to our CODEGEN-NL models, in terms of training data and model size. All models are evaluated with temperature t∈{0.2, 0.6, 0.8}, and the pass@k is computed where k∈{1, 10, 100} for each model. For direct comparison to the results by Chen et al., Evaluating large language models trained on code, arXiv preprint arXiv:2107.03374, 2021, the temperature is chosen that yields the best-performing pass@k for each k. The results of the program synthesis models 130 and baselines are summarized in FIG. 6.

As shown in FIG. 6, the CODEGEN-NL models (350M, 2.7B, 6.1B) outperform or perform on par with the respective GPT-NEO and GPT-J models. Further training CODEGEN-NL on multilingual programming language data (BIGQUERY) leads to CODEGEN-MULTI. The multilingual CODEGEN models outperform the models trained on THEPILE (GPT-NEO, GPT-J, CODEGEN-NL) by a large margin. The CODEGEN MULTI is then finetuned on a Python-only dataset (BIGPYTHON), resulting in CODEGEN-MONO. The program synthesis capacity is improved substantially. Therefore, the Python program synthesis capacity enhances as the amount of Python training data increases. For almost all models, as expected, increasing the size of the model improves overall performance. The Python-monolingual CODEGEN models have competitive or improved performance, compared to the current state-of-the-art models, Codex. CODEGEN-MONO 2.7B underperforms CODEX 2.5B when k=100 but outperforms it when k∈{1, 10}. While it is only half the size of CODEX 12B, the CODEGEN-MONO 6.1B demonstrates pass@k scores approaching those of the best-performing Codex, CODEX 12B. Our CODEGEN-MONO 16.1B outperforms it.

The success of a program synthesis system highly depends on how well it understands user intent. When the system is based on a language model, the perplexity of problem prompts provides a proxy for the system's understanding5 of user intent specifications. A low perplexity of an intent specification under a model indicates that this intent specification is compatible with the knowledge learned by the model from the training data. Then data experiments are done to investigate whether better prompt understanding, with lower prompt perplexity as a proxy, leads to more functionally accurate programs. All problems are partitioned into pass versus non-pass ones. A pass problem is one that at least one sample from 200 samples passes all test cases, while for a non-pass problem none of the 200 samples pass all test cases. The average perplexity of the problem prompts of the pass problems is computed and that of the non-pass ones, based on samples from CODEGEN-MONO models. The results are displayed in FIG. 7. The prompts of the pass problems have lower perplexity than those of the non-pass ones. This finding implies that program synthesis is more likely to be successful when the user intent specification is understood better by the model. Indeed, some training data contains interleaved sequences of natural language comments and programs, where the comments describe the functionality of following program. We thus speculate that user intent specifications similar to such a pattern would be better understood by the model, and hence lead to better program synthesis. Therefore, user intent may be specified in multiple turns such that the model focuses on a partial problem at a time, which would make user intent understanding by the model easier.

In some embodiments, a conversational program synthesis paradigm where the process of synthesizing a program is cast as a multi-turn conversation between a user and a system, similar to that illustrated in FIG. 5. To examine such a paradigm, a Multi-Turn Programming Benchmark (MTPB) is developed. MTPB consists of 115 problems written by experts. The description to solve each problem is factorized into multiple steps, each of which includes a description in natural language (prompt). To solve a problem, a model needs to synthesize functionally correct subprograms (1) following the description at the current step and (2) considering descriptions and synthesized subprograms at previous steps (e.g., correct backreference of functions and/or variables defined in the previous steps).

In one embodiment, MTPB may be constructed by curating a set of 115 problems requiring a diverse range of programming knowledge, including math problems, array operations, string manipulations, algorithms, data science, and problems that require other knowledge. For each problem, multi-turn prompts that serve as the step-by-step instruction for the model are included, ensuring that these (1) form at least three turns and (2) do not attribute problem solving in one turn. To evaluate synthesized programs with functional correctness, 5 test cases are included for each problem. While creating the test cases, non-trivial ones that would only pass given the correct solutions are included. Unlike HumanEval for which models are expected to complete a partially defined function, MTPB problems only provide the prompts, thereby models have to generate the solution from scratch. While the free-form generation may allow for more potential solutions, the lack of an entry point to provide test case inputs makes 221 it challenging to test the generated code on diverse test cases. To overcome this challenge, test case inputs are embedded within prompts. Specifically, prompts are written with Python's formatted string8 where input values are substituted for the variable name when a certain test case is applied to the problem. For example, a prompt, "Define a string named 's' with the value {var}.", together with a test case input var='Hello' will be formatted into "Define a string named 's' with the value 'Hello'."

In one embodiment, for execution, the history of pairs of prompts and generated completions is concatenated into a self-contained program (see the example shown in FIG. 5). The program is then executed in an isolated Python environment following the single-turn HumanEval benchmark. However, the problems in HumanEval are constructed in such a way that a known function signature is completed, thus invocation of the generated code under a set of functional unit tests is trivial. In the multi-turn case, no such entry point (or return value) is guaranteed to be generated. To circumvent the issue of a missing return signature (or value), the last prompt of the multi-turn problems in MTPB is always specified to print out the resulting state to the terminal. Then, the benchmark execution environment overloads the Python print(args) function and stores args on a stack. If the sampled code for the last prompt of a problem does not include the print( ) statement, which is a valid convention to print on the terminal in Python or specifically Jupyter notebooks, then the AST of the generated code will be mutated to inject an invocation of print( ) Finally, a type-relaxed equivalence check (e.g., an implicit conversion between lists and tuples) of args against the predefined gold output of the problem is performed to determine test failure or success.

In this analysis, data experiments are further done to investigate how the model size and data size affect the program synthesis capacity in a multi-turn conversational paradigm. The language models are trained in four sizes, 350M, 2.7B, 6.1B and 16.1B, on the following datasets: THEPILE, BIGQUERY, BIGPYTHON, which have increasingly more Python data (see Section 2.1 for more details). GPT-NEO, GPT-J, CODEGEN-NL models are trained on THEPILE. CODEGEN-MULTI models are initialized with CODEGEN-NL models, and then trained on the BIGQUERY. CODEGEN-MONO models are initialized with CODEGEN-MULTI models, and then trained on the BIGPYTHON. In the MTPB, each problem has 5 test cases and 40 samples are sampled for each test case with each model, based on which the pass rate is computed for each problem. The MTPB evaluation results (average pass rate) for the CODEGEN models and the baselines are shown in FIG. 8. Clearly, the performance on the MTPB proves as a function of the model size and data size. This suggests that the capacity of conversational program synthesis scales as a function of the model size and data size. The models are simply trained with an autoregressive language modeling objective. While the model and the data scale up, conversational capacity emerges, that is, the capacity to synthesize programs in a multi-turn fashion.

The multi-turn factorization enhances the model's understanding of user intent specifications, which in turn lead to higher program synthesis capacity. To test this hypothesis, a single-turn counterpart of multi-turn specifications by concatenating each specification into a single turn. The perplexity of the multi-turn prompts and that of the concatenated single-turn prompts under the four CODEGEN-MONO models are compared. The average perplexity over all the problems in the MTPB are displayed in the left panel of FIG. 9. For all models, the single-turn specification has a higher average perplexity than the multi-turn specification. It implies that the multi-turn user specifications can be better understood by the models. The average perplexity for both multi-turn and single-turn intent specifications under larger models is slightly lower than that under smaller models, indicating that the larger ones understand the user intent better than the smaller ones.

The program synthesis is then compared in pass-rate with the multi-turn prompts to that with the concatenated single-turn prompts. The results are shown in the right panel of FIG. 9. Multi-turn specifications lead to close to or more than 10 percentage points over single-turn specifications for all model sizes. Together with the perplexity analysis above, it appears that factorizing a user specification into multiple steps and leveraging the emerged conversational capacity of large language models allow them to digest the specification more easily and synthesize programs more successfully.

Figures 9, 10:
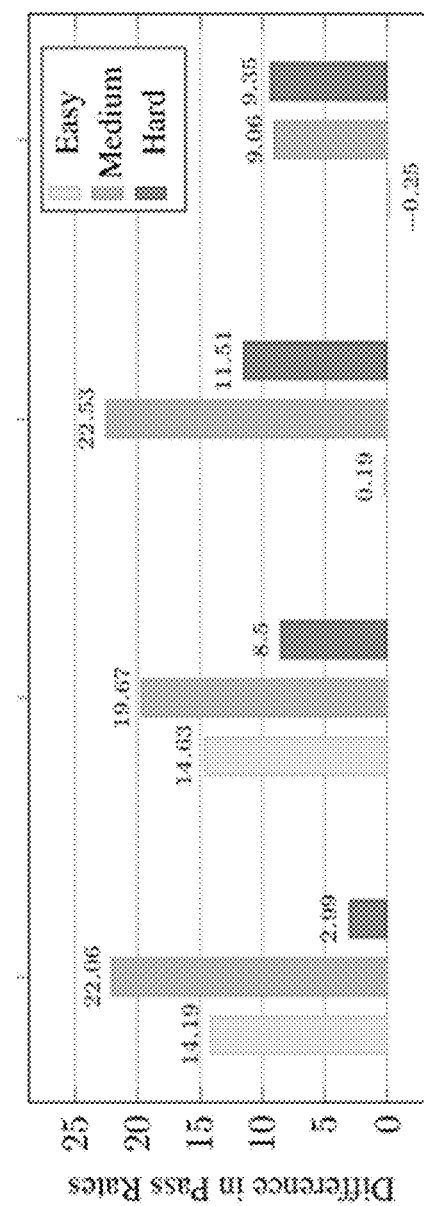

Furthermore, the problems may be categorized by difficulty level based on their average pass rates ("hard" with less than 30%, "easy" with larger than 70%), and examine the interaction effect between difficulty level and model size on the improvement by multi-turn factorization. The results are shown in FIG. 10. Across almost all model sizes and difficulty levels, multi-turn prompts lead to significant improvement over single-turn prompts and most improvements are nearly or higher than 10 percentage points. Interestingly, the larger models (6.1B and 16.1B) are invariant to multi-turn factorization for easy problems (see the two short bars, 0.19% and −0.25%, in FIG. 10). This implies that when the problems can be easily understood by the model (due to the combined effect of easiness of the problems and the high capacity of larger models), it is not necessary or beneficial to factorize the specifications. This is in fact consistent with our motivating assumption that factorizing complicated specifications would ease problem understanding and improve program synthesis.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system for code program synthesis for a target problem, the system comprising:
   a communication interface configured to receive a specification in natural language relating to a task problem, wherein the specification is decomposed into a plurality of prompts;
   a memory storing one or more language models and a plurality of processor-executable instructions; and
   one or more hardware processors reading the plurality of processor-executable instructions to perform operations comprising:
      obtaining, at a first generation timestep, a first prompt from the plurality of prompts;
      generating, by the one or more language models, a first subprogram in response to the first prompt at the first generation timestep;
      obtaining, at a second generation timestep, a second prompt from the plurality of prompts;

generating, by the one or more language models, a second subprogram in response to the second prompt and based on the first subprogram and the first prompt, at the second generation timestep;

concatenating generated subprograms from a series of generation timesteps corresponding to the plurality of prompts into an output code program; and generating a result for the task problem by executing the output code program.

2. The system of claim 1, wherein the specification is paired with an expected result of the task problem, and wherein the generated result is compared with the expected result for evaluating accuracy of the one or more language models.

3. The system of claim 1, wherein the one or more language models comprise one or more auto-regressive Transformer models trained by a next-token prediction language modeling objective.

4. The system of claim 1, wherein the one or more hardware processors comprise a tensor processing unit (TPU) having a high-speed toroidal mesh interconnect.

5. The system of claim 4, wherein the one or more language models are trained on the one or more hardware processors by performing a same computation on different input data in parallel on different hardware processors.

6. The system of claim 5, wherein the operations further comprising:

partitioning a batch of training data into a plurality of subsets of training data; and distributing the plurality of subsets of training data to a plurality of virtual machines of the one or more hardware processors, respectively.

7. The system of claim 6, wherein the operations further comprising:

in response to determining that a total size of the one or more language models is no greater than a pre-defined threshold, replicating the total amount of model parameters across a number of TPU boards; and in response to determining that a total size of the one or more language model is greater than the pre-defined threshold, sharing the total amount of model parameters across the number of TPU boards.

8. A method for code program synthesis for a target problem, the method comprising:

receiving, via a communication interface, a specification in natural language relating to a task problem, wherein the specification is decomposed into a plurality of prompts;

obtaining, at a first generation timestep, a first prompt from the plurality of prompts;

generating, by one or more language models implemented at one or more hardware processors, a first subprogram in response to the first prompt at the first generation timestep;

obtaining, at a second generation timestep, a second prompt from the plurality of prompts;

generating, by the one or more language models, a second subprogram in response to the second prompt and based on the first subprogram and the first prompt, at the second generation timestep;

concatenating generated subprograms from a series of generation timesteps corresponding to the plurality of prompts into an output code program; and generating a result for the task problem by executing the output code program.

9. The method of claim 8, wherein the specification is paired with an expected result of the task problem, and wherein the generated result is compared with the expected result for evaluating accuracy of the one or more language models.

10. The method of claim 8, wherein the one or more language models comprise one or more auto-regressive Transformer models trained by a next-token prediction language modeling objective.

11. The method of claim 8, wherein the one or more language models are trained on the one or more hardware processors by performing a same computation on different input data in parallel on different hardware processors.

12. The method of claim 11, further comprising:

partitioning a batch of training data into a plurality of subsets of training data; and distributing the plurality of subsets of training data to a plurality of virtual machines of the one or more hardware processors, respectively.

13. The method of claim 12, further comprising:

in response to determining that a total size of the one or more language models is no greater than a pre-defined threshold, replicating the total amount of model parameters across a number of TPU boards; and in response to determining that a total size of the one or more language model is greater than the pre-defined threshold, sharing the total amount of model parameters across the number of TPU boards.

14. A non-transitory processor-readable storage medium storing a plurality of processor-executable instructions for code program synthesis for a target problem, the instructions being executed by one or more hardware processors to perform operations comprising:

receiving, via a communication interface, a specification in natural language relating to a task problem, wherein the specification is decomposed into a plurality of prompts;

obtaining, at a first generation timestep, a first prompt from the plurality of prompts;

generating, by one or more language models implemented at the one or more hardware processors, a first subprogram in response to the first prompt at the first generation timestep;

obtaining, at a second generation timestep, a second prompt from the plurality of prompts;

generating, by the one or more language models, a second subprogram in response to the second prompt and based on the first subprogram and the first prompt, at the second generation timestep;

concatenating generated subprograms from a series of generation timesteps corresponding to the plurality of prompts into an output code program; and generating a result for the task problem by executing the output code program.

15. The non-transitory processor-readable storage medium of claim 14, wherein the specification is paired with an expected result of the task problem, and wherein the generated result is compared with the expected result for evaluating accuracy of the one or more language models.

16. The non-transitory processor-readable storage medium of claim 14, wherein the one or more language models comprise one or more auto-regressive Transformer models trained by a next-token prediction language modeling objective.

17. The non-transitory processor-readable storage medium of claim 14, wherein the one or more hardware processors comprise a tensor processing unit (TPU) having a high-speed toroidal mesh interconnect.

18. The non-transitory processor-readable storage medium of claim 17, wherein the one or more language models are trained on the one or more hardware processors by performing a same computation on different input data in parallel on different hardware processors, and wherein the operations further comprising:
  partitioning a batch of training data into a plurality of subsets of training data; and
  distributing the plurality of subsets of training data to a plurality of virtual machines of the one or more hardware processors, respectively.

19. The non-transitory processor-readable storage medium of claim 18, wherein the operations further comprising:
  in response to determining that a total size of the one or more language models is no greater than a pre-defined threshold, replicating the total amount of model parameters across a number of TPU boards; and
  in response to determining that a total size of the one or more language model is greater than the pre-defined threshold, sharing the total amount of model parameters across the number of TPU boards.

20. The non-transitory processor-readable storage medium of claim 14, wherein the operations further comprising:
  generating, by the one or more language models, a question for a user;
    receiving a response from the user in response to the question; and
    generating the second subprogram further based on the received response.

* * * * *